United States Patent
Hamilton

(10) Patent No.: US 7,053,923 B1
(45) Date of Patent: May 30, 2006

(54) ESTABLISHING AUDIO COMMUNICATION DURING INITIALIZATION OF VIDEO CONFERENCE CALLS

(75) Inventor: Alistair R. Hamilton, Stony Brook, NY (US)

(73) Assignee: NCR Corporation, Dayton, OH (US)

( * ) Notice: Subject to any disclaimer, the term of this patent is extended or adjusted under 35 U.S.C. 154(b) by 1429 days.

(21) Appl. No.: 09/181,151

(22) Filed: Oct. 28, 1998

(51) Int. Cl.
*H04N 7/14* (2006.01)

(52) U.S. Cl. .............................. 348/14.08; 348/14.09; 348/14.01; 348/14.11

(58) Field of Classification Search ................. 348/14, 348/15, 17; 379/202, 93.17, 93.21; 370/261, 370/266
See application file for complete search history.

(56) References Cited

U.S. PATENT DOCUMENTS

| | | | | |
|---|---|---|---|---|
| 5,371,534 A | * | 12/1994 | Dagdeviren et al. | 348/14 |
| H1714 H | * | 3/1998 | Partridge, III | 348/14 |
| 5,929,897 A | * | 7/1999 | Schneider et al. | 348/15 |

FOREIGN PATENT DOCUMENTS

| | | | | |
|---|---|---|---|---|
| JP | 409023414 A | * | 1/1997 | |
| JP | 410210437 A | * | 8/1998 | |

\* cited by examiner

*Primary Examiner*—Melur Ramakrishnaiah
(74) *Attorney, Agent, or Firm*—Corey Welte

(57) ABSTRACT

A system for setting up video conferencing calls. Setting up such calls imposes a delay of about 45 seconds. Under the invention, an audio call is established immediately, and is held during the delay. During the audio call, static pictures of the conference participants are displayed to the participants. After set-up becomes complete, an audio-video conference is held, using live audio and video.

8 Claims, 6 Drawing Sheets

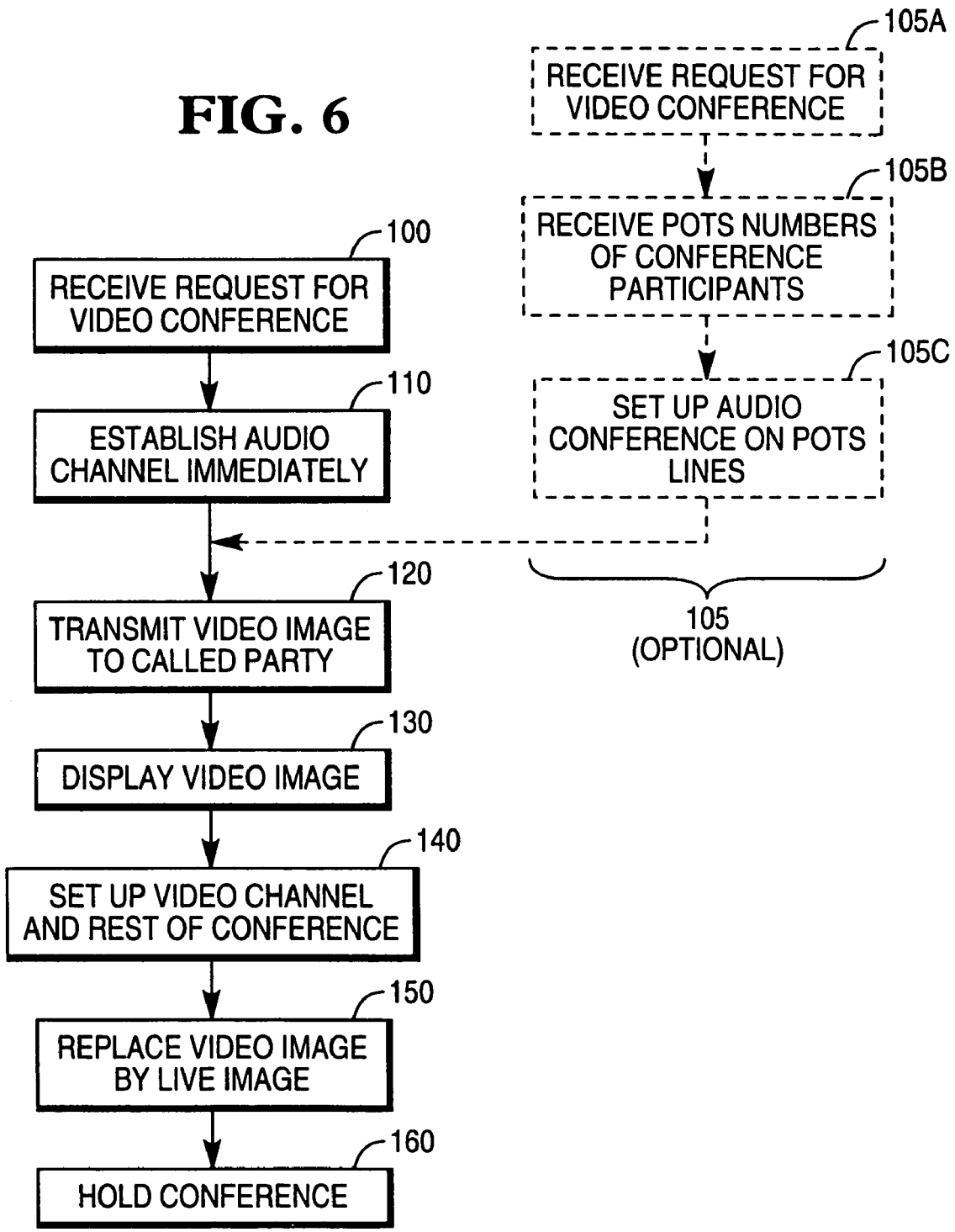

ESTABLISHING AUDIO COMMUNICATION DURING INITIALIZATION OF VIDEO CONFERENCE CALLS

The invention concerns an approach to initializing a video conference. An audio conference is first, and rapidly, established. During the audio conference, static pictures, such as photographs of the parties, are displayed to the parties on computer monitors, while initialization of the video conference proceeds. After initialization is complete, the audio conference is converted into a video conference.

BACKGROUND OF THE INVENTION

When a caller initiates a video conference call, a delay of about 45 seconds is encountered while various set-up procedures are undertaken by agents which include (1) the caller's video terminal, (2) the telephone service carrier, and (3) the called party's video terminal. During this time, the caller is given no assurance that the set-up procedures are proceeding normally, although sometimes background music is played to the caller during the set-up process. This delay, and the lack of assurances, can create apprehension in the caller, and can cause the caller to abandon the attempted conference. One reason is that the silent telephone channel appears dead to the caller. Prior experience has taught callers that a telephone channel which appears dead will often remain so. For example, it is a common experience for ordinary telephone callers to be placed "on hold." Frequently, the "on hold" calls are accidentally terminated, after a period of silence. Experiences like this have conditioned telephone users to assume that silence on a telephone line will evolve into a termination. A silent telephone line does not invite a caller to persist in completing a call.

In addition, if the caller places the video conference call from a public kiosk, it is possible that the caller's tendency to abandon the call may be increased, partly because of the hectic nature of the environment surrounding many public kiosks.

In addition, even if the delay and lack of assurance do not cause the caller to abandon the call, the presentation of a dead communication channel is not consistent with user-friendliness, and can give the impression that the organization which provides the video conferencing service does not take an active interest in the quality of service provided.

OBJECTS OF THE INVENTION

An object of the invention is to provide improved video conferencing.

A further object of the invention is to provide an improved set-up procedure for video conferencing calls.

A further object of the invention is to provide a video conferencing system which, as a matter of course, begins with an audio conference, which is then converted into a video conference.

SUMMARY OF THE INVENTION

In one form of the invention, a request for an audio-video conference is met by first establishing an audio conference, with a display of static visual images. During the audio conference, a video channel is set up, and when the video channel becomes available, the audio conference is converted into a true audio-video conference.

BRIEF DESCRIPTION OF THE DRAWINGS

FIG. 6 is a flow chart of logic implemented by the invention.

DETAILED DESCRIPTION OF THE INVENTION

Video conferencing based on the microcomputer is becoming widely used. The invention will be explained in this context, and FIGS. 1–5 illustrate a sequence of events undertaken by one form of the invention. It is, of course, recognized that other types of video conferencing are possible.

Figure 1:
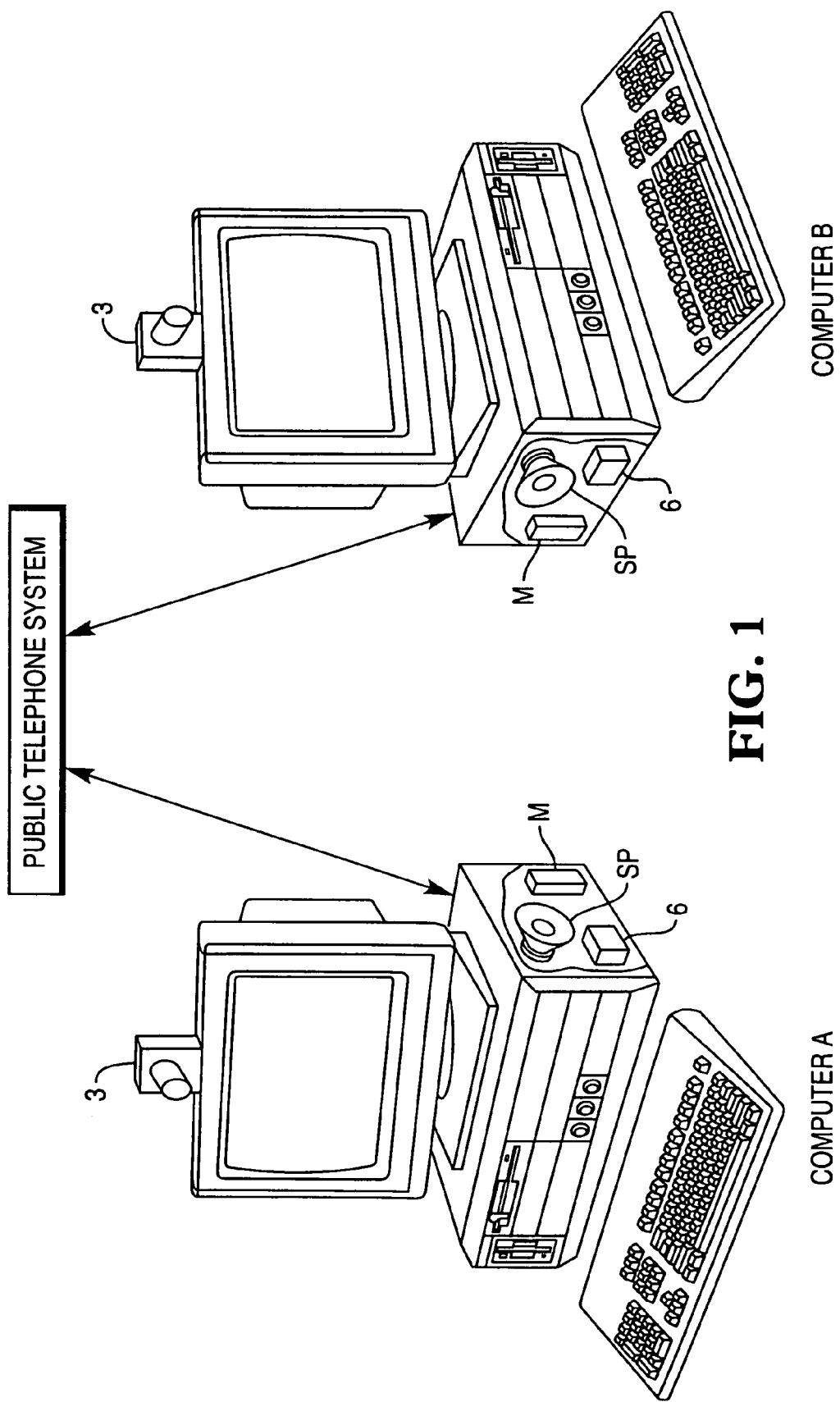
FIG. 1 illustrates equipment utilized by the invention.

FIG. 1 illustrates two microcomputers A and B. Each is equipped with a video camera 3, a microphone M, a speaker SP, and video conferencing software 6. One example such software is found in the VISTIUM system, which is commercially available from AT & T Corporation.

A microcomputer-based video conferencing system is described in U.S. Pat. No. 5,608,872, S/N 34,313, issued Mar. 4, 1997, in which the inventors are Schwartz, Carleton, FitzPatrick, and Pommier, which is hereby incorporated by reference.

Figure 2:
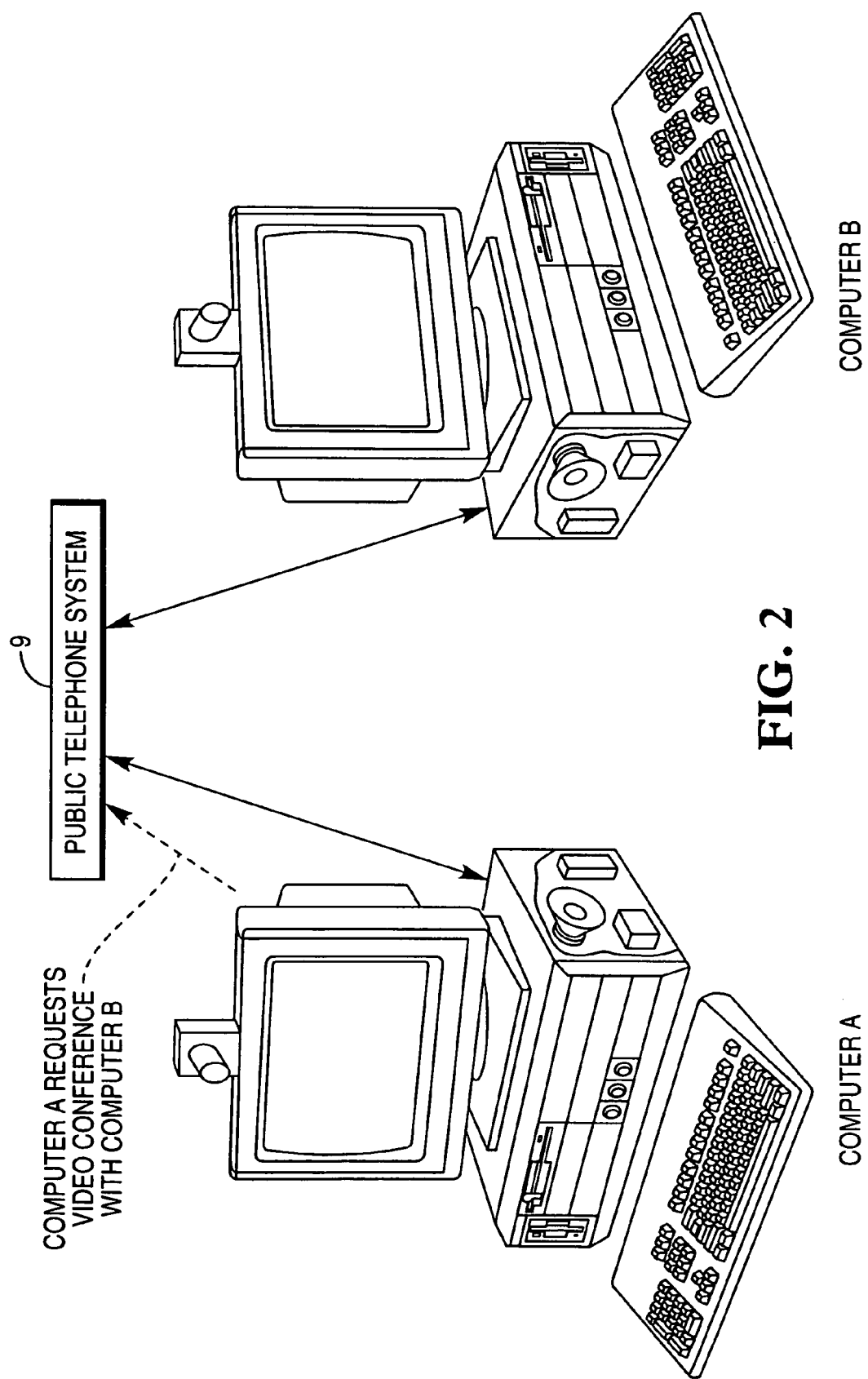
FIGS. 2–5 illustrate events occurring during operation of the invention.

In FIG. 2, computer A requests a video conference with computer B, as by issuing the appropriate signals to the public telephone system 9. The latter eventually establishes a high-bandwidth channel between the two computers, such as an ISDN connection. (ISDN is an acronym for INtegrated Services Digital Network. An ISDN channel is a digital channel.) Setting up this channel requires a time delay. However, at the moment of A's request, two events are executed almost immediately, prior to the completion of the set-up.

Figure 3:
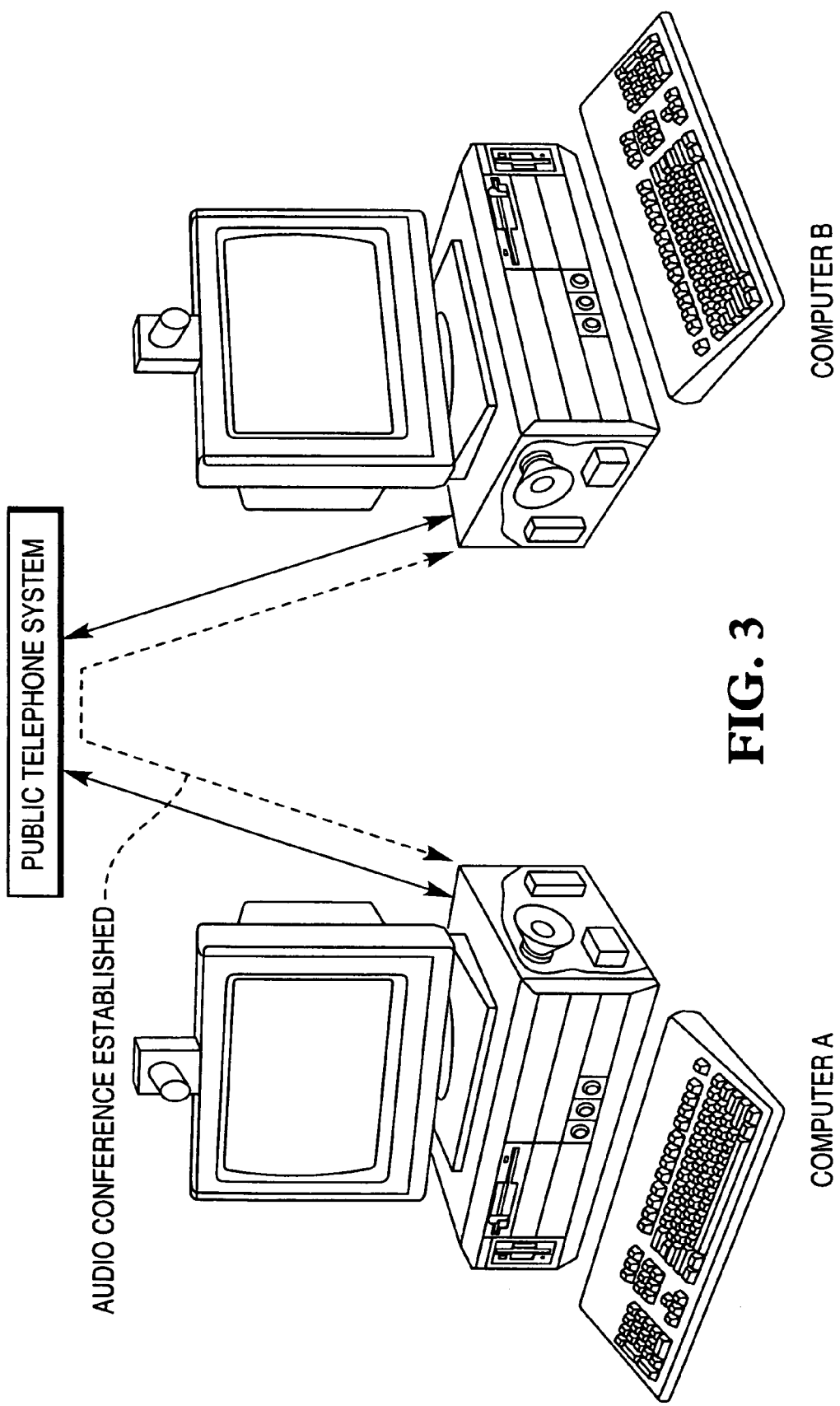

One is that an audio conference is established between the computers, as indicated in FIG. 3. In the forthcoming video conference, part of the high-bandwidth channel, or sub-channel, will be allocated to carry audio information, as by carrying digitized packets of speech data. Under the invention, this sub-channel is established immediately, and an audio conference is made available immediately.

Figure 4:
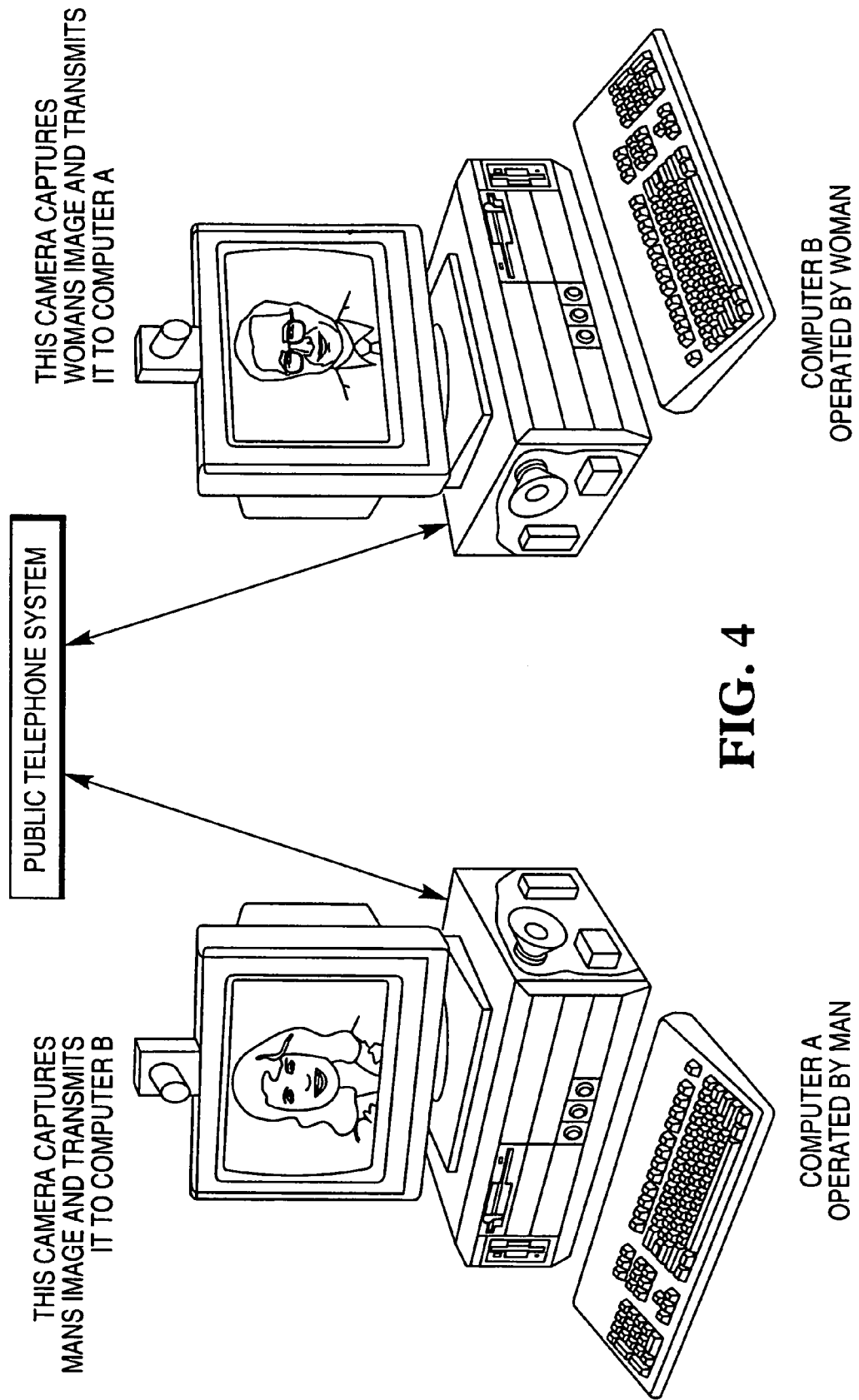

The second event is that each computer displays a static visual image, such as a photograph of the other conference participant, as indicated in FIG. 4. To repeat, each static image on a computer is not of the operator of that computer, but of the operator of the other computer. As FIG. 4 indicates, the image displayed by computer A is of the woman (not shown except on the display) operating the computer B. Similarly, the image displayed by computer B is of the man (not shown except on the display) operating the computer A.

The static images can be generated in several ways. In one approach, the video cameras 3 at each computer shoot a still frame of each participant, and transmit that still frame to the other computer, immediately following the request for the audio-video conference.

In another approach, it is assumed that a given group of parties hold video conferences on a regular basis. All their computers are equipped, in advance, with the appropriate still photographs. These photographs are updated on a regular basis. These photographs can be taken using the video cameras 3 in the Figures, and the digital image can be distributed to the other cameras, as by using electronic mail.

In another approach, the photographs are not stored in the individual computers, but in a common server. This approach can be attractive for industrial users. Many workers in large companies are equipped with individual computers, which are connected through a network to one, or more, servers. As a variant of this approach, the server can be accessed through a public-service network, such as the INTERNET.

Irrespective of the particular mode of delivering the photographic images to the computers, at this time, the participants are connected by an audio connection, as indicated in FIG. 3, and their computers display static images of the other conference participants, as indicated in FIG. 4. (Only two participants are shown.) If, for some reason, photographs are not available, a neutral background image can be displayed, together with the names of the conference participants.

Figure 5:
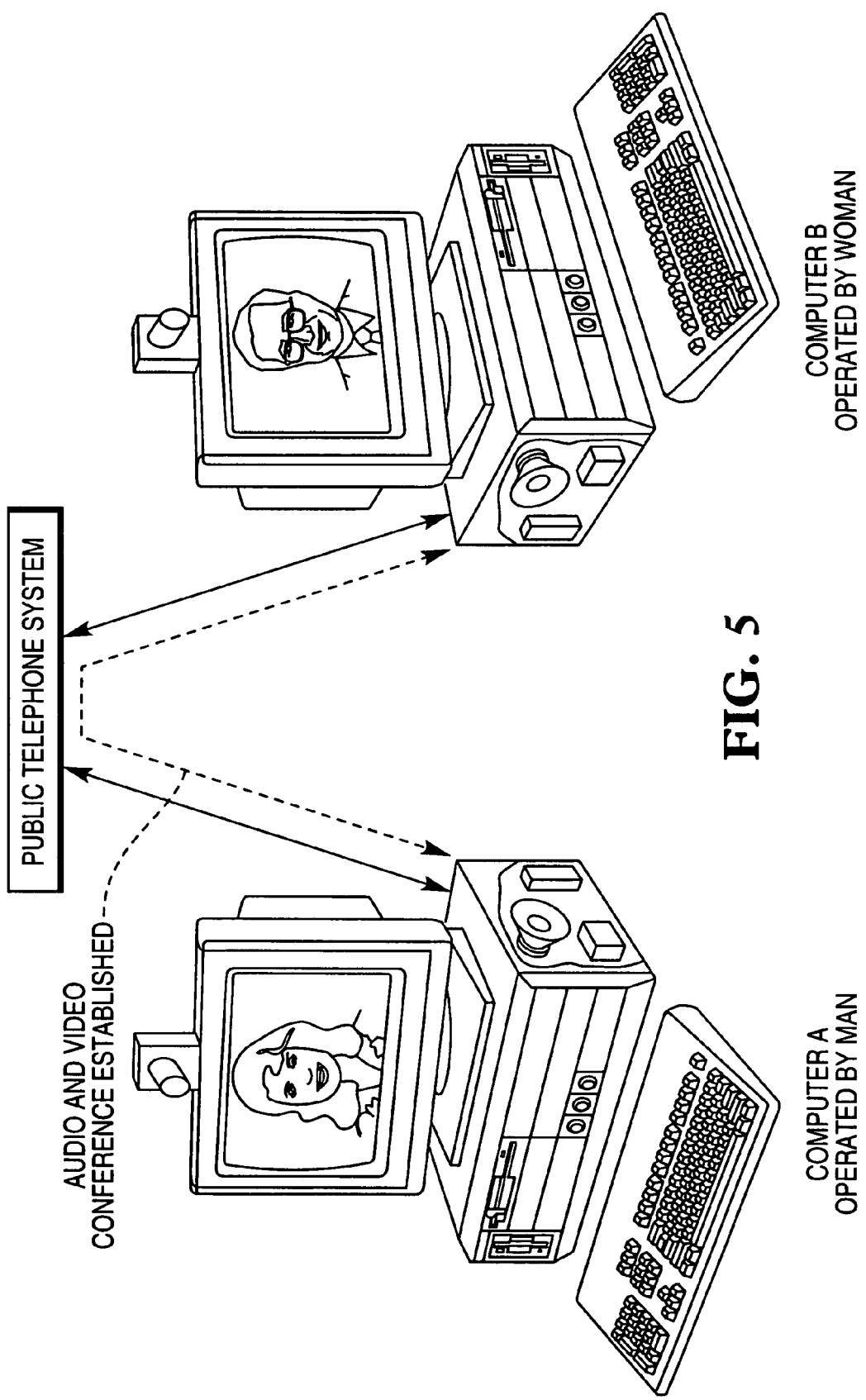

At this time, the participants are able to confer over the audio channel. This audio conferencing ability, together with the display of the static pictures, assures the participants that the set-up of the forthcoming audio-video conference is proceeding normally. During the audio conference, the software 6 in FIG. 1 continues its set-up routines. After set-up is completed, a video conference is added to the audio conference, and a full audio-video conference becomes available, as indicated in FIG. 5.

FIG. 6 illustrates a flow chart of logic undertaken by one form of the invention. In block 100, a request is made for establishment of an audio conference. In block 110, an audio conference is established immediately, or nearly so. In block 120, static video images are transmitted to the parties to the conference. As explained above, this step can be undertaken at the time of the conference, or beforehand.

In block 130, the images are displayed. At this time, the participants can hold an audio conference, while viewing static images of the other participants. Meanwhile, in block 140, the system sets up a video channel, and handles the set-up details for the rest of the conference. In block 150, after completion of the initialization, the static images are replaced by live video images, taken by the cameras 3 in FIG. 1. In block 160, the participants hold an audio-video conference.

Additional Considerations

1. It is possible that the audio conference can be established using a channel which is separate from the high-bandwidth channel. For example, if a computer is equipped with a high-bandwidth channel, it is likely that a standard telephone is located nearby, connected to a voice-grade telephone channel, commonly called POTS, for Plain Old Telephone Service. This telephone can be used for the audio conference, while the video component is being set up.

In particular, the overall procedure would be quite similar to that described above, but with the following exceptions. In FIG. 6, blocks 100 and 110 are replaced by optional blocks 105. The request of block 105A is accompanied by the POTS numbers of the participants, as indicated in block 105B. (It is not necessary that the request contain the telephone number of the initiating party, because the telephone central office automatically knows that number.)

As indicated in block 105C, an audio conference is set up, as known in the art: the telephone central office issues ring signals to the POTS telephones of the parties involved. All parties' POTS telephones ring. They respond, and hold a POTS audio conference. Meanwhile, the audio-NCR video conference is set up. When it is complete, the parties terminate the POTS conference, and participate in the audio-video conference, on the high-bandwidth channel.

2. From one point of view, four sub-conferences are involved. (1) An audio-only conference is accompanied by (2) a static video image. Then, (3) an audio conference is accompanied by (4) a live video conference, in a live audio-video conference.

In most cases, the live video conference, element (4), will replace the static image. But complete replacement is not strictly necessary. The static video image can be shrunk to a window of lesser prominence.

At least two possible transitions between the audio conferences, elements (1) and (3), can be envisioned. In one transition, audio conference (1) occupies part of the bandwidth of the high-bandwidth channel ultimately used. Audio conference (3) occupies the same channel. In another transition, audio conference (1) is a POTS conference, as discussed above. Audio conference (3) occupies part of the high-bandwidth channel.

The second transition may be more noticeable to the participants than the first. But, in both cases, an initial audio conference, between identical parties, is followed by a sequel audio conference, among the same parties.

3. As technology improves, data transfer rates will increase. Thus, no strict requirement exists that the images of FIG. 4 be literally "static." They may contain minor movement, or animation. The limitation in amount of data is imposed by the time required to transfer the data. The following amounts of times are considered acceptable, in various embodiments: ½ second, 1 second, and all integral numbers of seconds, through ten seconds.

Numerous substitutions and modifications can be undertaken without departing from the true spirit and scope of the invention. What is desired to be secured by Letters Patent is the invention as defined in the following claims.

What is claimed is:

1. A method of establishing an audio-video conference, comprising the following steps:
   a) setting up an audio-video conference on a high-bandwidth communication channel;
   b) during the setting-up step, holding an audio conference using a POTS channel; and
   c) after setting up completes
      i) holding the audio-video conference on the high-bandwidth channel; and
      ii) terminating the audio conference on the POTS channel.

2. Method according to claim 1, wherein the parties who participate in the audio-video conference are the same parties who participate in the audio conference.

3. Method according to claim 1, wherein the audio conference is held using telephones, and, prior to the audio conference, a telephone company issued ring signals to at least some of the telephones.

4. Method according to claim 1, wherein the audio-video conference utilizes a communication channel, and the audio conference utilizes a sub-channel of said communication channel.

5. Method according to claim 1, wherein the audio-video conference utilizes a relatively high bandwidth communication channel, and the audio conference utilizes a relatively low bandwidth POTS channel.

6. Method according to claim 1, and further comprising:
   d) during the setting-up step, displaying static pictures of the conference participants on equipment later used to hold the audio-video conference.

7. Method according to claim 6, and further comprising:
e) terminating display of the static pictures after the setting-up completes.

8. Method according to claim 6, and further comprising:
e) replacing each static picture by a live video image of the participant previously depicted in the static picture.

* * * * *